(12) United States Patent
Liu et al.

(10) Patent No.: US 7,727,499 B2
(45) Date of Patent: Jun. 1, 2010

(54) AMMONIA OXIDATION CATALYST FOR POWER UTILITIES

(75) Inventors: Xinsheng Liu, Edison, NJ (US);
Pascaline Tran, Holmdel, NJ (US);
Gerald Lapadula, Piscataway, NJ (US)

(73) Assignee: BASF Catalysts LLC, Florham Park, NJ (US)

( * ) Notice: Subject to any disclaimer, the term of this patent is extended or adjusted under 35 U.S.C. 154(b) by 0 days.

(21) Appl. No.: 11/864,813

(22) Filed: Sep. 28, 2007

(65) Prior Publication Data

US 2009/0087367 A1    Apr. 2, 2009

(51) Int. Cl.
*B01D 53/58* (2006.01)
(52) U.S. Cl. .................. 423/237; 423/239.1
(58) Field of Classification Search ............ 423/237, 423/239.1
See application file for complete search history.

(56) References Cited

U.S. PATENT DOCUMENTS

| 3,900,554 A | 8/1975 | Lyon |
| 4,208,386 A | 6/1980 | Arand et al. |
| 4,325,924 A | 4/1982 | Arand et al. |
| 5,233,934 A | 8/1993 | Krigmont et al. |
| 5,510,092 A | 4/1996 | Mansour et al. |
| 2001/0041157 A1* | 11/2001 | Spokoyny ............ 423/235 |
| 2003/0202927 A1 | 10/2003 | Minkara et al. |
| 2003/0202929 A1 | 10/2003 | Golley |
| 2004/0253158 A1 | 12/2004 | Honjo et al. |
| 2006/0029534 A1* | 2/2006 | Eiteneer et al. ......... 423/237 |
| 2006/0182672 A1 | 8/2006 | Hallam |

FOREIGN PATENT DOCUMENTS

| JP | 54-018490 A | * | 2/1979 |
| WO | 2005061103 A | | 7/2005 |
| WO | 2007004774 A | | 1/2007 |

OTHER PUBLICATIONS

PCT International Search Report, Date of Mailing Feb. 6, 2009.

* cited by examiner

*Primary Examiner*—Timothy C Vanoy
(74) *Attorney, Agent, or Firm*—Scott S. Servilla; Diehl Servilla LLC; Melanie L. Brown (57) ABSTRACT

The present invention is directed to a method for removal by oxidation of the excess ammonia ($NH_3$) gas ("ammonia slip") resulting from flue gases that have been subjected to selective catalytic reduction (SCR) for reduction of nitrogen oxides (NOx) with ammonia. More specifically, the inventive method uses an ammonia oxidation catalyst consisting of a zeolite, one or more precious metals, and a base metal compound, to catalyze the oxidation of both ammonia and carbon monoxide (CO), while minimizing the formation of nitrogen oxides (NOx). The present invention is useful in treating flue and exhaust gases.

18 Claims, 6 Drawing Sheets

AMMONIA OXIDATION CATALYST FOR POWER UTILITIES

FIELD

The present invention is directed towards a method for removal by catalytic oxidation of the excess ammonia ($NH_3$) from flue gases that have been subjected to selective catalytic reduction (SCR) of oxides of nitrogen (NOx) by ammonia injection. More specifically, the present invention is directed to an oxidation catalyst that selectively and efficiently catalyzes the oxidation of ammonia ($NH_3$) to nitrogen ($N_2$), and carbon monoxide (CO) to carbon dioxide ($CO_2$), with minimal catalysis of ammonia ($NH_3$) to nitrogen oxides (NOx).

BACKGROUND

Much of the electrical power used in homes and businesses throughout the world is produced in power plants that burn a fossil fuel (i.e. coal, oil, or gas) in a boiler. The resulting hot exhaust gas (also sometimes termed "flue gas") turns a gas turbine or boils water to produce steam, which turns a steam turbine, and the turbine cooperates with a generator to produce electrical power. The flue gas stream is subsequently passed through an air preheater, such as a rotating wheel heat exchanger that transfers heat from the flue gas to an incoming air stream, which thereafter flows to the combustor. The partially cooled flue gas is directed from the air preheater to the exhaust stack.

The flue gas contains contaminants such as sulfur oxides (SOx), nitrogen oxide (NOx), carbon monoxide (CO) and particulates of soot when coal is used as the primary fuel source. The discharge of all of these contaminates into the atmosphere is subject to federal and local regulations, which greatly restrict the levels of these flue gas components.

To meet the reduced levels of NOx emissions from power stations, as required by environmental regulations, many fossil fuel-fired electric generating units are being equipped with either selective catalytic reduction (SCR) or selective non-catalytic reduction (SNCR) technologies. In SCR, the most common method used is to inject ammonia or urea based reagents in the presence of a vanadium oxide catalyst where the ammonia reacts to reduce the oxides of nitrogen. SCR is generally accomplished at lower temperatures than SNCR. The SCR system typically operates at flue gas temperatures ranging between 300° C. and 450° C. U.S. Pat. No. 5,104,629 illustrates one known type of SCR installation.

In SNCR, the most common method used is to inject ammonia or urea based reagents into the upper furnace to reduce the oxides of nitrogen without the use of a catalyst. The SNCR system operates at flue gas temperatures ranging between 850° C. and 1150° C. U.S. Pat. Nos. 3,900,554, 4,208,386, and 4,325,924 illustrate known types of SNCR applications.

At coal-fired power plants, ammonia injection systems for SCR and SNCR systems are typically installed in the high-temperature and high-dust region of the flue gas stream, which typically is prior to ash collection. One common problem with the SCR and SNCR technologies is that some residual ammonia, known as ammonia slip, negatively impacts downstream components and processes such as: air pre-heater fouling, fly ash contamination, and ammonia gas emission into the atmosphere. The ammonia slip problem is further exacerbated as the result of SCR catalyst surface deterioration as well as misdistribution in flue gas velocity, temperature, and concentrations of ammonia and NOx.

An additional problem with the current methods is that increased ammonia injections will more efficiently remove the oxides of nitrogen, but then the excess ammonia will result in increased ammonia slip in the flue gas. In coal-fired power plants this excess ammonia can, in addition, contaminate the resulting coal based fly ash.

Even in power plants that are based on natural gas or oil, the environmental effects of the exhausted ammonia is undesirable. The EPA has enacted a variety of regulatory initiatives aimed at reducing NOx. It was determined that the combustion of fossil fuels is the major source of NOx emissions. These control regulations were established by the EPA under Title IV of the Clean Air Act Amendments of 1990 (CAAA90). In July 1997 the EPA proposed another change in the New Source Performance Standards and these revisions were based on the performance that can be achieved by SCR technology.

As briefly described above, the treatment of exhaust gases from boilers and the like presents the following disadvantages:

(1) that some ammonia is left unremoved in the treated gas;
(2) low NOx decomposition rate; and
(3) large ammonia consumption.

The disadvantages (1) and (2) are correlated.

For example, if the ammonia supply is increased in order to raise the NOx decomposition rate, the proportion of residual ammonia in the treated gas will be high. This residual ammonia may exceed the amounts that are permitted by existing regulations to pass into the atmosphere. Thus, the nitrogen oxide separation efficiency of the known processes is limited by the amount of unreacted ammonia that can be discharged into the atmosphere.

Besides, variation in the load on the combustion equipment will change the temperature, at the point where ammonia is introduced, to a value deviated from the optimum temperature range, and this in turn will decrease the decomposition rate, tending to increase the proportion of residual ammonia. Even in a small proportion, the residual ammonia will react rapidly with the sulfuric acid content of the exhaust gas to produce acid ammonium sulfate. This product will stick to the rear heat-transfer surface in the relatively low-temperature region, for example, to the heating surfaces of the air preheater and associated parts of a boiler, causing an increase in pressure loss, hampering the operation of the combustion equipment, and attacking the materials of the equipment for their eventual corrosion.

As described above, the ammonia left unremoved in the treated exhaust gas provides a major obstacle in the way to practical operation. Consequently, there is an upper limit to the ammonia supply and naturally the NOx decomposition rate is low. This has been a problem in the practice of high-temperature noncatalytic denitrification. Furthermore, ammonia, which is introduced in the high-temperature region, undergoes a concomitant reaction for decomposing itself, resulting in the disadvantage (3) of excess consumption of ammonia, or more than the equivalent for the NOx-decomposing reaction. This tendency will be pronounced as the amount of ammonia injection is increased in anticipation of an enhanced decomposition rate. This has been another limiting factor for the rate of NOx decomposition to be attained conventionally.

It is important to accomplish the reaction of the ammonia and NOx in an efficient manner, for maximum possible reaction of both the NOx and the ammonia. If the reaction is incomplete, either NOx or ammonia (or both) may pass through to the stack and be emitted to the atmosphere. Both NOx and ammonia are classified as pollutants, and their emission is to be maintained within legal limits. Furthermore, depending upon the temperature at the cold end of the air preheater, excess ammonia slip may cause clogging of the space between adjacent air preheater heating elements because of the formation of ammonium sulfate/bisulfate, and/ or agglomerated fly ash. This results in increased pressure loss of the heat exchanger, corrosion of the apparatus, and therefore unstable operation for a prolonged period and other disadvantages.

In addition, many coal-fired power plants dispose of the collected fly ash by selling it to purchasers who further process the fly ash for commercial uses (i.e. lightweight aggregate for concrete mixtures). Fly ash produced at coal-fired power plants is commonly used in concrete applications as a pozzolanic admixture and for partial replacement for cement. Fly ash consists of alumino-silicate glass that reacts under the high alkaline condition of concrete and mortar to form additional cementitious compounds. Fly ash is an essential component in high performance concrete. Fly ash contributes many beneficial characteristics to concrete including increased density and long-term strength, decreased permeability and improved durability to chemical attack. Also, fly ash improves the workability of fresh concrete.

When ammonia contaminated fly ash is used in Portland cement based mortar and concrete applications, the ammonium salts dissolve in water to form $NH_4^+$. Under the high pH (pH>12) condition created by cement alkali, ammonium cations ($NH_4^+$) are converted to dissolved ammonia gas ($NH_3$). Ammonia gas evolves from the fresh mortar or concrete mix into the air exposing concrete workers. The rate of ammonia gas evolution depends on ammonia concentration, mixing intensity, exposed surface area, and ambient temperature. While it is believed that the ammonia that evolves has no measurable effect on concrete quality (strength, permeability, etc.), the ammonia gas can range from mildly unpleasant to a potential health hazard. The human nose detects ammonia odors at levels of 5 to 10 ppm. The OSHA threshold and permissible limits are set at 25 and 35 ppm for Time-Weighted Average (TWA) (8-hr) and Short-Term Exposure Limit (STEL) (15-min), respectively. Ammonia gas concentration between 150 and 200 ppm can create a general discomfort. At concentrations between 400 and 700 ppm, ammonia gas can cause pronounced irritation. At 500 ppm, ammonia gas is immediately dangerous to health. At 2,000 ppm, death can occur within minutes.

Other than OSHA exposure limits, there are no current regulatory, industry or ASTM standards or guidelines for acceptable levels of ammonia in fly ash. However, based on industry experience, fly ash with ammonia concentration at less than 100 mg/kg does not appear to produce a noticeable odor in Ready-Mix concrete. Depending on site and weather conditions, fly ash with ammonia concentration ranging between 100 and 200 mg/kg may result in unpleasant or unsafe concrete placement and finishing work environment. Fly ash with ammonia concentration exceeding 200 mg/kg would produce unacceptable odor when used in Ready-Mixed concrete applications.

In addition to the risk of human exposure to ammonia gas evolving from concrete produced using ammonia laden ash, the disposal of ammonia laden ash in landfills and ponds at coal burning power stations could also create potential risks to humans and the environment. Ammonium salt compounds in fly ash are extremely soluble. Upon contact with water, the ammonium salts leach into the water and could be carried to ground water and nearby rivers and streams causing potential environmental damage such as ground water contamination, fish kill and eutrophication. Ammonia gas could also evolve upon wetting of alkaline fly ashes, such as those generated from the combustion of western sub-bituminous coal. Water conditioning and wet disposal of alkaline fly ashes would expose power plant workers to ammonia gas.

U.S. Pat. No. 5,233,934 to Krigmont et al. discloses a control method of reducing NOx in flue gas streams utilizing an SNCR treatment followed by an SCR treatment. The Krigmont et al. method tries to maximize the NOx removal in the SNCR stage, subject to certain ammonia slip restrictions, and injecting additional ammonia for the SCR stage.

U.S. Pat. No. 5,510,092 to Mansour et al. discloses a combined SNCR/SCR process in which SCR is employed for primary NOx reduction and $NH_3$ is injected into the SNCR zone only when the NOx content of the SCR effluent exceeds a pre-selected design maximum value.

U.S. Patent Application Publication No. 2003/0202927 to Minkara et al. discloses a process to reduce ammonia concentration and emissions from both coal-fired plants and plants that use other hydrocarbon fuels. The process in the Minkara et al. application adds an ammonia oxidation catalyst, specifically manganese dioxide, downstream of the SCR system to remove the undesirable ammonia slip by reacting the ammonia with the residual oxygen present in the flue gas.

U.S. Patent Application Publication No. 2006/0182672 to Tran et al. discloses a process that removes by oxidation the excess ammonia gas from flue gases that have been subjected to SCR using a secondary catalyst located downstream of the SCR system. According to Tran et al. the secondary catalyst comprises a precious metal and vanadia on a metal oxide such as titania.

As discussed above, for SCR of oxides of nitrogen with ammonia to work well and result in the lowest values of NOx, it is preferable to be able to use excess ammonia. However, when the quantity of ammonia used is high enough to effectively remove the NOx through SCR, some of the excess ammonia will go through the catalyst unchanged and exit as ammonia slip in the flue gases creating the problem of a toxic reactive gas in the exiting gases. Another major problem created by the excess ammonia exiting in the flue gases, particularly from coal-fired plants, is that the ammonia contaminates the fly ash that is intended for use in mixtures with cement to make concrete. Thus, a need exists for a safe and efficient method for minimizing ammonia slip downstream from the primary SCR catalyst. To keep ammonia emissions low, an oxidation catalyst may be utilized downstream to convert ammonia "slip" to $N_2$. Unfortunately, conventional oxidation catalyst not only catalyze $NH_3$ to $N_2$ reactions but also $NH_3$ to NO. Accordingly, it has been a long-standing challenge in the art to find an oxidation catalyst that selectively and efficiently catalyzes $NH_3$ to $N_2$.

SUMMARY

The present invention is directed to a method of removing ammonia in flue gases where ammonia is used as a selective catalytic reduction agent with a primary catalyst for reducing oxides of nitrogen. The present invention provides a method for treating the flue gas stream generated by a stationary combustion source equipped with a selective catalytic reduction (SCR) system and for selectively oxidizing unreacted ammonia to nitrogen, said method comprising: (a) contacting said flue gas stream containing said unreacted ammonia with an ammonia oxidation catalyst in the presence of an oxidant, wherein said ammonia oxidation catalyst comprises a zeolite, a precious metal and a base metal compound; and (b) thereby oxidizing said unreacted ammonia to nitrogen. The method of this invention comprises adding ammonia to flue gases to reduce oxides of nitrogen under SCR conditions and oxidizing any unreacted ammonia with a secondary ammonia oxidation catalyst containing a zeolite, one or more precious metals, and a base metal to reduce the ammonia content in the flue gas. In one embodiment, the ammonia oxidation catalyst of the present invention is placed downstream from the primary SCR catalyst and reduces the ammonia and CO concentrations in exiting flue gases with minimal catalysis of ammonia to nitrogen oxides. In another embodiment, one or more rare earth metals can optionally be added to stabilize the ammonia oxidation catalyst.

DETAILED DESCRIPTION

In order to reduce the emissions of nitrogen oxides from flue and exhaust gases, such as the exhaust generated by gas turbine engines in a coal-fired power plant, ammonia is added to the exhaust gas stream containing the nitrogen oxides and the gaseous stream is then contacted with a suitable catalyst at elevated temperatures in order to catalyze the reduction of nitrogen oxides with ammonia. The reduction of nitrogen oxides with ammonia to form nitrogen and $H_2O$ is catalyzed by a suitable catalyst to preferentially result in the oxidation of ammonia by the oxygen, hence the process is often referred to as the "selective" catalytic reduction ("SCR") of nitrogen oxides. SCR of nitrogen oxides can be depicted by the following reactions:

$$4NO+4NH_3+O_2 \rightarrow 4N_2+6H_2O \quad (1)$$

$$2NO_2+4NH_3+O_2 \rightarrow 3N_2+6H_2O \quad (2)$$

The catalysts employed in the SCR process ideally should be able to retain good catalytic activity under high temperature conditions of use, for example, 400° C. or higher, under hydrothermal conditions and in the presence of sulfur compounds. High temperature and hydrothermal conditions are often encountered in practice, such as in the treatment of gas turbine engine exhausts. The presence of sulfur or sulfur compounds is often encountered in treating the exhaust gases of coal-fired power plants and of turbines or other engines fueled with sulfur-containing fuels such as fuel oils and the like.

Theoretically, it would be desirable in the SCR process to provide ammonia in excess of the stoichiometric amount required to react completely with the nitrogen oxides present, both to favor driving the reaction to completion and to help overcome inadequate mixing of the ammonia in the gaseous stream. However, in practice, significant excess ammonia over the stoichiometric amount is normally not provided because the discharge of unreacted ammonia from the catalyst would itself engender an air pollution problem. Such discharge of unreacted ammonia can occur even in cases where ammonia is present only in a stoichiometric or sub-stoichiometric amount, as a result of incomplete reaction and/or poor mixing of the ammonia in the gaseous stream. Channels of high ammonia concentration are formed in the gaseous stream by poor mixing and are of particular concern when utilizing catalysts comprising monolithic honeycomb-type substrate supports comprising refractory bodies having a plurality of fine, parallel gas flow paths extending therethrough because, unlike the case with beds of particulate catalysts, there is no opportunity for gas mixing between channels.

The primary SCR catalyst can be any form of catalyst known in the industry that reduces oxides of nitrogen. For the purpose of nitrogen oxide reduction, it is preferred to have an extruded homogeneous catalyst. One such embodiment is an extruded homogeneous honeycomb catalyst containing a mixture of vanadia and titania and, optionally, tungsten. Such catalysts are well known within the industry and typically provide ammonia slip values from about 5 ppm to about 10 ppm. Catalyst-coated honeycombs or plates can also be used.

Flue gas streams, particularly those emitted from stationary sources such as natural gas-fueled electrical generating plants, will contain ammonia in amounts in excess of that permitted under current state and federal air quality regulations. Such excess ammonia results from injection of an ammonia stream into the exhaust gas stream in the presence of an SCR catalyst in order to reduce the level of nitrogen oxides in the gas stream to nitrogen such that the treated exhaust gas stream will contain a level of nitrogen oxides below the maximum level permitted by current state and federal air quality regulations. It is therefore necessary to further treat the exhaust gas stream to reduce the amount of ammonia to a level below the maximum permitted by such regulations without concomitantly significantly increasing the amount of nitrogen oxides in the exhaust gas stream before it is released into the atmosphere.

The exhaust gas stream that exits the SCR catalyst bed will typically contain about 5 to about 20 ppm of ammonia, about 5 to about 50 ppm of carbon monoxide, about 5 to about 15% of carbon dioxide, about 5 to about 15 wt. % of water (in the form of steam) and about 70 to about 90 wt. % of air such that the overall oxygen level is at least about 14 wt. %. In the method of the present invention, the ammonia in the gas stream will be selectively oxidized to nitrogen by the oxygen in the air in the presence of the ammonia oxidation catalyst of this invention. Any carbon monoxide present in the exhaust gas stream will be concurrently oxidized to carbon dioxide.

The method of the invention for selectively oxidizing the ammonia in the gas stream to nitrogen comprises contacting the ammonia-containing flue gas stream with the ammonia oxidation catalyst of the invention in the presence of an oxidant, such as air, at a temperature of about 200° to about 450° C. The oxidant is typically oxygen in the form of air that is already present in the exhaust gas stream to be treated. However, if necessary, a supplemental supply of air may be injected into the exhaust gas stream in order to insure that the oxygen content during the reaction will be at least 10 wt. %.

The present invention incorporates an ammonia oxidation catalyst, which can be located downstream from the primary SCR catalyst. In this manner, ammonia slip that passes through the SCR catalyst will be oxidized as the ammonia passes through the ammonia oxidation catalyst. The ammonia oxidation catalyst must possess several beneficial features, including; reducing the ammonia slip to lower levels (less than 2 ppm) under flue gas conditions that have very low amounts of oxygen (about 2%), reducing CO levels and substantially maintaining $SO_2$ levels. Ammonia oxidation occurs by the following reactions:

$$4NH_3 + 3O_2 \rightarrow 2N_2 + 6H_2O \quad (3)$$

$$2NH_3 + 2O_2 \rightarrow N_2O + 3H_2O \quad (4)$$

$$4NH_3 + 5O_2 \rightarrow 4NO + 6H_2O \quad (5)$$

The invention disclosed herein adds a highly efficient ammonia oxidation catalyst, which can be located downstream of the SCR system to remove the undesirable ammonia slip by reacting it with the residual oxygen present in the flue gas. Surprisingly, it has been found that the ammonia oxidation catalysts of the present invention could be used for this purpose even under conditions where there may only be a small amounts of residual oxygen in the flue gas. However, as mentioned above, a supplemental supply of air can be injected into the exhaust gas stream in order to insure that the oxygen content during the reaction will be at least 10 wt. %.

It has also been found that the performance of the oxidation catalyst used for ammonia removal, particularly the preferential conversion to elemental nitrogen (rather than to nitrogen oxides), is temperature-dependent. That is, high temperatures tend to favor formation of nitrogen oxides, while lower temperatures tend to decrease the rate of the catalytic reaction. As those skilled in the art will appreciate, intermediate optimum temperatures can be determined for different catalytic systems that favor the formation of elemental nitrogen from the ammonia slip. Even at intermediate temperatures, some formation of $N_2O$ and NO may occur. However, the amount can be minimized by selecting appropriate process conditions, namely the reaction temperature, space velocity and specific catalyst composition.

Normally, the operating temperature of the oxidation catalyst should remain close to the operating temperature of the SCR catalyst. For most noble metals, it has been found that the oxidation catalyst temperature should range between about 105° C. and 350° C., with the maximum operating temperature range being about 100° C. to 700° C. Typical operating temperatures for the ammonia oxidation catalyst of the present invention are from about 200° to about 450° C., operating temperatures from about 300° to about 450° C., from about 325° to about 375° C., are also exemplified. See, e.g. FIG. 5. It has also been found that acceptable catalyst space velocities range between about 5,000 and 150,000 $hr^{-1}$.

Exhaust gas streams that can be treated in accordance with this invention often inherently contain substantial amounts of oxygen. For example, a typical exhaust gas of a turbine engine contains from about 2 to 15 volume percent oxygen and from about 20 to 500 volume parts per million nitrogen oxides, the latter normally comprising a mixture of NO and $NO_2$. Usually, there is sufficient oxygen present in the gaseous stream to oxidize residual ammonia, even when an excess over the stoichiometric amount of ammonia required to reduce all the nitrogen oxides present is employed. However, in cases where a very large excess over the stoichiometric amount of ammonia is utilized, or wherein the gaseous stream to be treated is lacking or low in oxygen content, an oxygen-containing gas, usually air, may be introduced between the first catalyst zone and the second catalyst zone, in order to insure that adequate oxygen is present in the second catalyst zone for the oxidation of residual or excess ammonia.

It is desired that the ammonia oxidation catalyst placed downstream from the SCR catalyst have the following criteria:

(a) a material capable of oxidizing ammonia at flue gas temperatures, oxygen concentration, and flow rates;

(b) a material capable of functioning in the presence of oxides of sulfur and nitrogen;

(c) a material that will produce minimal oxides of nitrogen by side reactions of the oxidation of ammonia;

(d) a material that will increase the reduction of NOx such that the exiting levels of ammonia would be 2 ppm or less;

(e) a material that will reduce levels of CO; and (f) a material that will maintain $SO_2$ levels.

In one embodiment, the ammonia oxidation catalyst of the present invention is located downstream from an SCR catalyst system that is responsible for reducing the nitrogen oxides. In another embodiment, the ammonia oxidation catalyst of the present invention can be incorporated into the SCR system. For example, the ammonia oxidation catalyst can be added to or mixed in with the SCR catalyst on the SCR catalyst substrate or the ammonia oxidation catalyst can be zone coated on the same substrate as the SCR catalyst downstream from the SCR catalyst. The ammonia oxidation catalyst of this invention comprises a zeolite, one or more precious metals and a base metal.

Zeolites are aluminosilicate crystalline materials having rather uniform pore sizes which, depending upon the type of zeolite and the type and amount of cations included in the zeolite lattice, range from about 3 to 10 Angstroms in diameter. Resistance to short term sulfur poisoning and the ability to sustain a high level of activity for the oxidation of ammonia by oxygen has been found to be provided by zeolites which also exhibit pore sizes large enough to permit adequate movement of the reactant molecules CO and $NH_3$ into, and the product molecules $N_2$, $CO_2$ and $H_2O$ out of, the pore system in the presence of sulfur oxide molecules resulting from short term sulfur poisoning, and/or sulfate deposits resulting from long term sulfur poisoning. The pore system of suitable size is interconnected in all three crystallographic dimensions. As is well known to the those skilled in the zeolite art, the crystalline structure of zeolites exhibits a complex pore structure having more or less regularly recurring connections, intersections and the like. Pores having a particular characteristic, such as a given dimension diameter or cross-sectional configuration, are said to be one dimensional if those pores do not intersect with other like pores. If the pores intersect only within a given plane with other like pores the pores of that characteristic are said to be interconnected in two (crystallographic) dimensions. If the pores intersect with other like pores lying both in the same plane and in other planes, such like pores are said to be interconnected in three dimensions, i.e., to be "three dimensional". It has been found that zeolites which are highly resistant to sulfate poisoning and provide good activity for the oxidation of ammonia with oxygen, and which retain good activity even when subject to high temperatures, hydrothermal conditions and sulfate poisons, are zeolites which have pores which exhibit a pore diameter of at least about 5 Angstroms and are interconnected in three dimensions. In another embodiment a pore diameter of at least about 7 Angstroms and interconnected in three dimensions is preferred.

Figure 2:
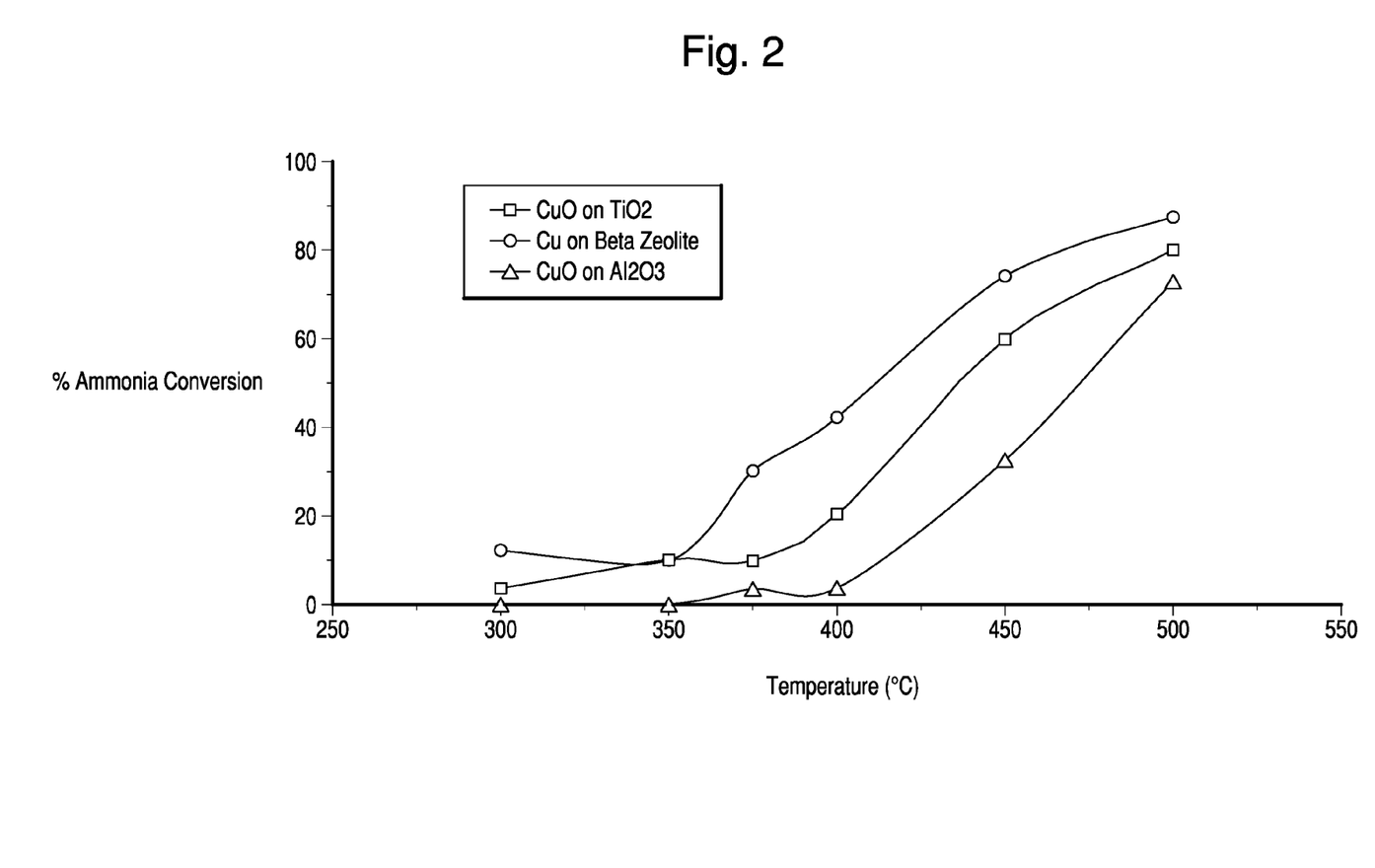
FIG. 2 depicts a graph comparing the selectivity and reactivity relative to ammonia conversion with zeolite, titania or alumina supports.
Figure 3:
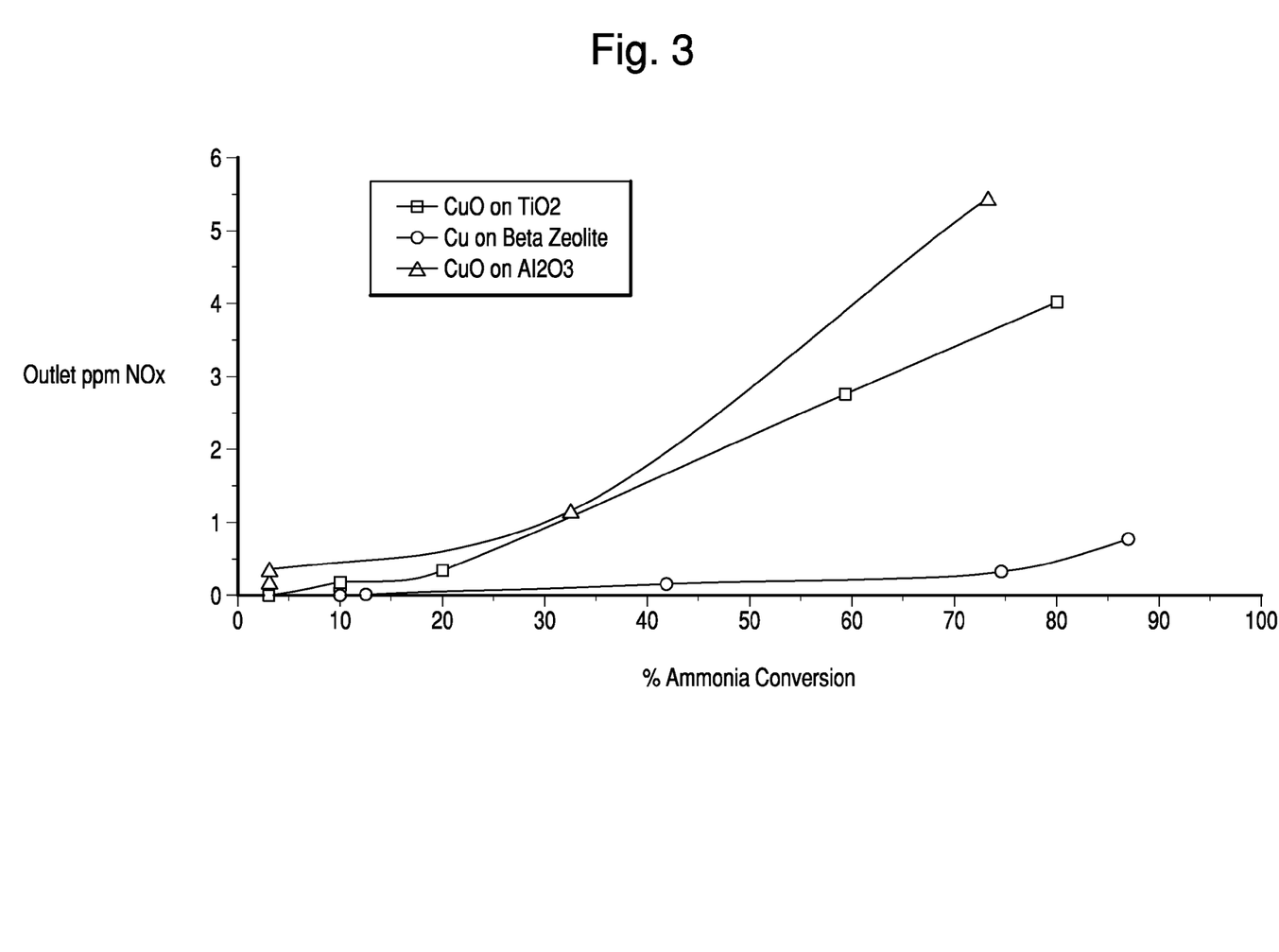
FIG. 3 depicts a graph comparing the selectivity relative to ammonia conversion of catalyst containing copper with zeolite, titania or alumina supports.

The catalyst composition of the present invention comprises a zeolite having a silica to alumina ratio of at least about 2, and a pore structure which is interconnected in all three crystallographic dimensions by pores having an average kinetic pore diameter of at least about 5 Angstroms, e.g. from about 5 to 8 Angstroms. In another embodiment, a silica to alumina ratio of from about 2.5 to about 12.5 is preferred. Experimental data, as depicted in FIGS. 2 and 3, has shown zeolite to provide better ammonia oxidation selectivity compared to other catalyst supports, such as metal oxides like titania, silica and alumina. Typically, any known zeolite can be used in the ammonia oxidation catalyst of the present invention. The zeolite can be a natural or synthetic zeolite such as faujasite, chabazite, clinoptilolite, mordenite, ferrierite, silicalite, zeolite X, zeolite Y, ultrastable zeolite Y, ZSM zeolite, ZSM-5, offretite, or a beta zeolite. Preferred zeolites include mordenite, ferrierite, zeolite Y, and beta zeolites.

Figure 1:
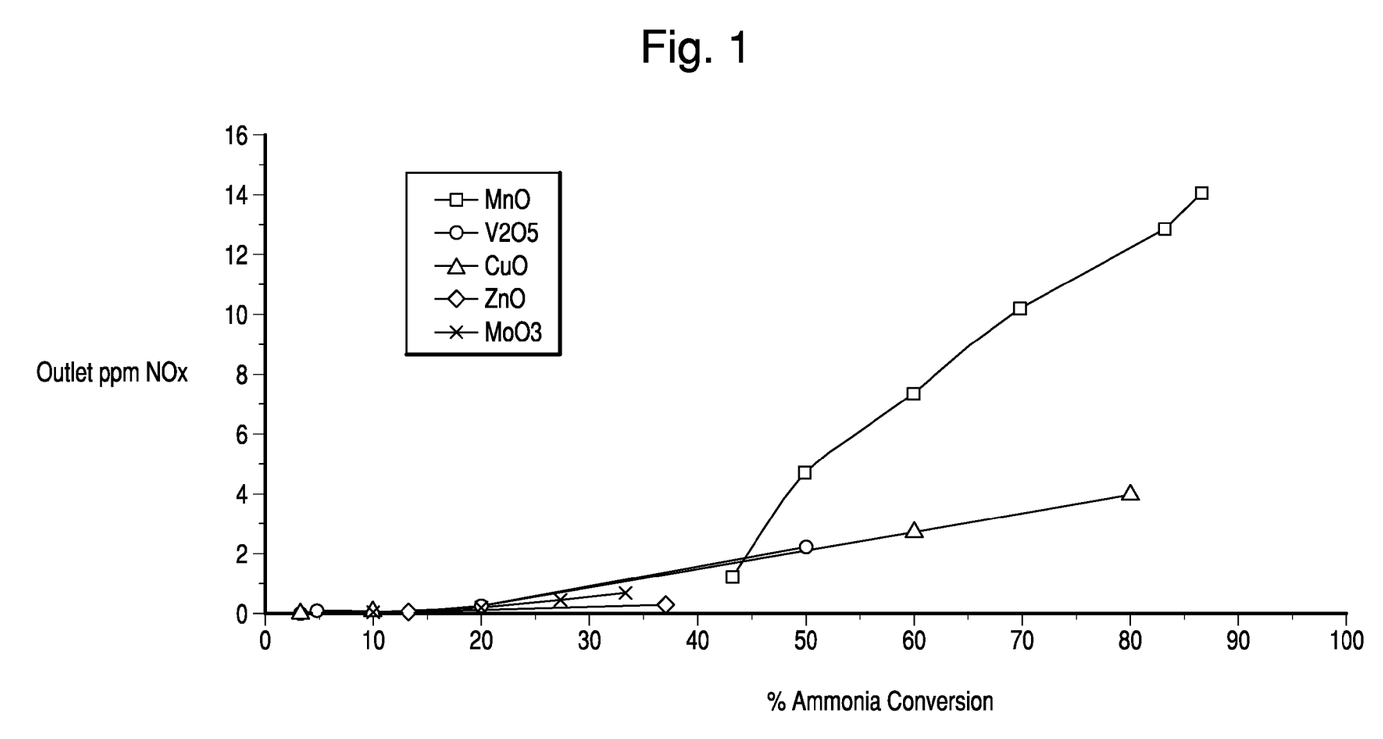
FIG. 1 depicts a graph comparing the selectivity relative to ammonia conversion of catalysts containing various metal oxides.

Any known base metal can be used with the ammonia oxidation catalyst of the present invention. The base metal can be any base metal compound or complex, such as a base metal oxide, base metal salt, base metal-oxygen complex (comprising multiple metal and oxygen atoms (e.g., O—Cu—O—Cu—O—Cu—O)), or base metal ion. Applicants have found that different base metal compounds can be achieved by varying the amount of the base metal used relative to the zeolite (see FIG. 6). In one embodiment, a base metal-oxygen complex (comprising multiple metal and oxygen atoms (e.g., O—Cu—O—Cu—O—Cu—O)) is preferred. Preferred base-metal-oxygen complexes include those of copper, vanadium, manganese, zinc, zirconium, and molybdenum. In another embodiment, a base metal oxide is preferred. Preferred metal oxides include copper oxide, vanadium oxide, manganese oxide, zinc oxide, zirconium oxide, molybdenum oxide and their corresponding ions, with copper oxide being the most preferred. Typically, the amount of base metal compound added to the ammonia oxidation catalyst ranges from about 2 wt. % to about 20 wt. % relative to the zeolite. In another embodiment, from about 2 wt. % to about 10 wt. % of base metal compound relative to the zeolite is added. In yet another embodiment, the base metal compound is from about 5 wt. % to about 16 wt. % when zeolite Y is used and from about 3 wt. % to about 8 wt. % when mordenite, beta, ferrierite or ZSM-5 zeolites are used. Experimental data, as depicted in FIG. 1, has shown copper oxide to be more selective than other metal oxides for ammonia conversion to nitrogen. More importantly, copper oxide appears to convert a substantial amount of ammonia without resulting in excess production of nitrogen oxides.

Precious metals such as platinum, palladium, rhodium or gold can be used. Platinum has been found to be the most active of the precious metals, and thus platinum is preferred. The ammonia oxidation catalyst of the present invention may contain a precious metal loading of from about 0.1 to about 100 g/ft$^3$. Loadings of precious metal from about 0.5 to about 60 g/ft$^3$, from about 1.0 to about 10 g/ft$^3$, from about 1.0 to about 5 g/ft$^3$, and about 5 g/ft$^3$ are also exemplified. In another embodiment, the ammonia oxidation catalyst of the present invention may contain from about 0.02 wt. % to about 0.20 wt. % of a precious metal, e.g., platinum. Precious metal contents of from about 0.02 wt. % to about 0.17 wt. % are also exemplified. In general, the precious metal can be incorporated onto the ammonia oxidation catalyst by any known means in the art. For example, the precious metal can be incorporated onto the ammonia oxidation catalyst by dispersing a compound and/or complex of one or more precious metals onto the zeolite. As used herein, the term "compound" means any salt, complex, or the like of a catalytically active component (or "catalytic component") which, upon calcination or upon use of the catalyst, decomposes or otherwise converts to a catalytically active form, which is often, but not necessarily, an oxide. The compounds or complexes of one or more precious metal catalytic compounds may be dissolved or suspended in any liquid which will wet or impregnate the support material, which does not adversely react with other components of the catalytic material and which is capable of being removed from the catalyst by volatilization or decomposition upon heating and/or the application of a vacuum. Generally, both from the point of view of economics and environmental aspects, aqueous solutions of soluble compounds or complexes are preferred. For example, suitable water-soluble platinum group metal compounds are chloroplatinic acid, amine solubilized platinum hydroxide, rhodium chloride, rhodium nitrate, hexamine rhodium chloride, palladium nitrate or palladium chloride, etc. The compound-containing liquid is impregnated into the pores of the bulk support particles of the catalyst, and the impregnated material is dried and preferably calcined to remove the liquid and bind the platinum group metal into the support material. In some cases, the completion of removal of the liquid (which may be present as, e.g., water of crystallization) may not occur until the catalyst is placed into use and subjected to the high temperature exhaust gas. During the calcination step, or at least during the initial phase of use of the catalyst, such compounds are converted into a catalytically active form of the precious metal or a compound thereof.

In another embodiment, one or more rare earth metals can optionally be added to stabilize the ammonia oxidation catalyst. The inventors have found that treating the zeolite with one or more rare earth metals, such as cerium (Ce) or samarium (Sm), results in improved hydrothermal stability of the catalyst. While not wishing to be bound by theory, it is theorized that the rare earth metal being slightly acidic results in the scission of the aluminum oxide from the zeolite framework which aluminum oxide is then recombined as aluminum oxide chains, which are linked to or associated with the zeolite framework. The rare earth metals (e.g., cerium or samarium) are not so acidic as to cause the complete dealumination and removal of the aluminum oxide from the zeolite. Typically, the rare earth metal will be added to the zeolite using an aqueous solution of the rare earth metal salt at a pH of 2 to 4 to provide a level of lanthanide of approximately 0.25 to 1 wt. % on the zeolite.

In general, any known method can be used for preparing the ammonium oxidation catalyst of the present invention. For example, the zeolite exchanged catalyst of the present invention can be prepared using an ion exchange process in which the zeolite is stirred in a metal salt bath for several hours at a constant pH and temperature. The resulting material is then filtered, dried and calcined. A slurry can then be prepared by milling the powder and subsequently coated onto a substrate (e.g., a honeycomb). Multiple ion exchange steps may be required using this traditional ion exchange process to achieve the desired metal loading.

In another embodiment, the ammonia oxidation catalyst of the present invention can be prepared by an incipient wetness method. Using this method, the metal will be incorporated using incipient wetness impregnation. The process involves impregnating a zeolite material, such as a zeolite Y powder, with the maximum amount of a metal salt solution that can be adsorbed by the zeolite without using any excess solution. To achieve the desired metal loading, the solution used for impregnation or exchange of the metal into the zeolite must have a high metal salt concentration and very low water content, typically less than 10 wt. % total water. The impregnated zeolite is then filtered, washed, calcined and slurried prior to being coated onto a substrate.

In yet another embodiment, the ammonia catalyst of the present invention can be prepared using a slurry method. The slurry method is a one step process for the preparation of the ammonia oxidation catalyst described hereinabove. The process involves the formation of a slurry containing the zeolite and base metal complex in the form of a metal nitrate, metal sulfate or metal chloride (e.g., copper nitrate, copper sulfate or copper chloride), and water. Optionally, a rare earth ion, as described hereinabove, can be added to the slurry prior to coating the slurry on a substrate. The slurry is typically ball milled for at least 30 minutes and can then be deposited onto a substrate (e.g., a honeycomb) by dip coating. Ball milling from about 30 minutes to about 10 hours, or for about 1 hour, are also exemplified. Typically, the slurry will contain a total water content of at least 20 wt. %. Water contents of at least 30 wt. %, at least 40 wt. %, at least 50 wt. % or at least 60 wt. %, are also exemplified. The slurry coated substrate can be dried and calcined (e.g., at 500-550° C. for 2 to 6 hours) prior to use. In accordance with this method, the metal exchange is carried out in the slurry step, allowing the expensive ion exchange step used in the art to be bypassed. Surprisingly, the ammonia oxidation catalyst produced using the slurry method shows better activity and stability than ammonia oxidation catalysts prepared by either the traditional ion exchange process or incipient wetness method. Furthermore, the ammonia oxidation catalyst prepared by the slurry method shows a more uniform distribution of the metal throughout the zeolite. While this slurry method can clearly be used to prepare an ammonia oxidation catalyst, as disclosed hereinabove, one of skill in the art would recognize the ability to use this slurry method in the preparation of other types of catalysts. For example, the slurry method disclosed herein can be used to prepare other catalysts which are supported on a substrate for the reduction of automobile emissions, particularly those that are washcoated onto a honeycomb type substrate.

Typically, the ammonia oxidation catalyst of the present invention is applied onto a substrate. The substrate may be any of those materials typically used for preparing exhaust gas treatment catalysts and will preferably comprise a metal or refractory ceramic having a honeycomb structure. Any suitable substrate may be employed, such as a monolithic substrate of the type having a plurality of fine, parallel gas flow passages extending therethrough from an inlet or an outlet face of the carrier, such that passages are open to fluid flow therethrough. The passages that are essentially straight paths from their fluid inlet to their fluid outlet, are defined by walls on which the ammonia oxidation catalyst is coated as a "washcoat" so that the gases flowing through the passages contact the catalytic material. The flow passages of the monolithic carrier are thin-walled channels which can be of any suitable cross-sectional shape and size such as trapezoidal, rectangular, square, sinusoidal, hexagonal, oval, circular, etc. Such structures may contain from about 60 to about 600 or more gas inlet openings (i.e., "cells") per square inch of cross section.

The ceramic substrate may be made of any suitable refractory material, e.g., cordierite, cordierite-α alumina, silicon nitride, zircon mullite, spodumene, alumina-silica magnesia, zircon silicate, sillimanite, magnesium silicates, zircon, petalite, α alumina, aluminosilicates and the like.

In one embodiment of the present invention, substrates useful for the ammonia oxidation catalyst are preferably metallic in nature and may be composed of one or more metals or metal alloys. The metallic substrates may be employed in various shapes such as corrugated sheet or monolithic form. Preferred metallic supports include the heat resistant metals and metal alloys such as titanium and stainless steel as well as other alloys in which iron is a substantial or major component. Such alloys may contain one or more of nickel, chromium and/or aluminum, and the total amount of these metals may advantageously comprise at least 15 wt. % of the alloy, e.g., 10 to 25 wt. % of chromium, 3 to 8 wt. % of aluminum and up to 20 wt. % of nickel. The alloys may also contain small or trace amounts of one or more other metals such as manganese, copper, vanadium, titanium and the like. The surface or the metal carriers may be oxidized at high temperatures, e.g., 1000° C. and higher, to improve the corrosion resistance of the alloy by forming an oxide layer on the surface the carrier.

The ammonia oxidation catalyst may be in the form of a particulate or a coating on a ceramic or metal structure, such as the above mentioned honeycomb structure. The catalysts of the present invention may also be provided in the form of extrudates, pellets, tablets or particles of any other suitable shape, for use as a packed bed of particulate catalyst, or as shaped pieces such as plates, saddles, tubes or the like.

A variety of deposition methods are known in the art for depositing the catalyst on the substrate. Methods for depositing the catalyst on the substrate include, for example, disposing the catalyst in a liquid vehicle to form a slurry and wetting the substrate with the slurry by dipping the substrate into the slurry, spraying the slurry onto the substrate, etc.

EXAMPLES

Example 1

51.25 g of a metal sulfate was added to 81.89 g DI water and stirred on magnetic stirrer until the copper sulfate was dissolved. 189.7 g of DT51 $TiO_2$ was added slowly to the copper solution. The solution was allowed to dry overnight at 150° C. and was calcined at 400° C. for 2 hrs. 150 g of the calcined powder was added to 225 g of DI water and sheared using a Waring blender for 1 min. The slurry was washcoated onto 1"×1"×6" cordierite honeycomb substrate at a target loading of 1.7 $g/in^3$ and calcined at 550° C. for 2 hrs.

This procedure was repeated to prepare cordierite honeycomb substrates containing $V_2O_5$, MnO, CuO, ZnO and $MoO_3$. The substrates were tested for ammonia conversion and outlet NOx. The results are shown in FIG. 1.

Example 2

25 grams of Cu acetate monohydrate (FW=199.65) or 29 grams of Cu nitrate hemipentahydrate (FW=232.59) were dissolved in 1800 ml de-ionized water in a 2-liter beaker under stirring at room temperature. After a clear solution was obtained, 220 grams of zeolite was added slowly. Zeolite, $TiO_2$ or $Al_2O_3$ powder was added to the above solution. The suspension was stirred at room temperature overnight. The solid powder was separated from the liquid by filtration. The cake was washed with de-ionized water three times (200 ml water each time) and oven dried at 100° C. The powder was calcined at 500° C. in air for 5 h. The calcined powder was then slurried and dip coated onto a cordierite honeycomb substrate.

The honeycomb substrates were tested for ammonia conversion and outlet NOx at various temperatures. Results are shown in FIGS. 2 and 3.

Example 3

Figure 4:
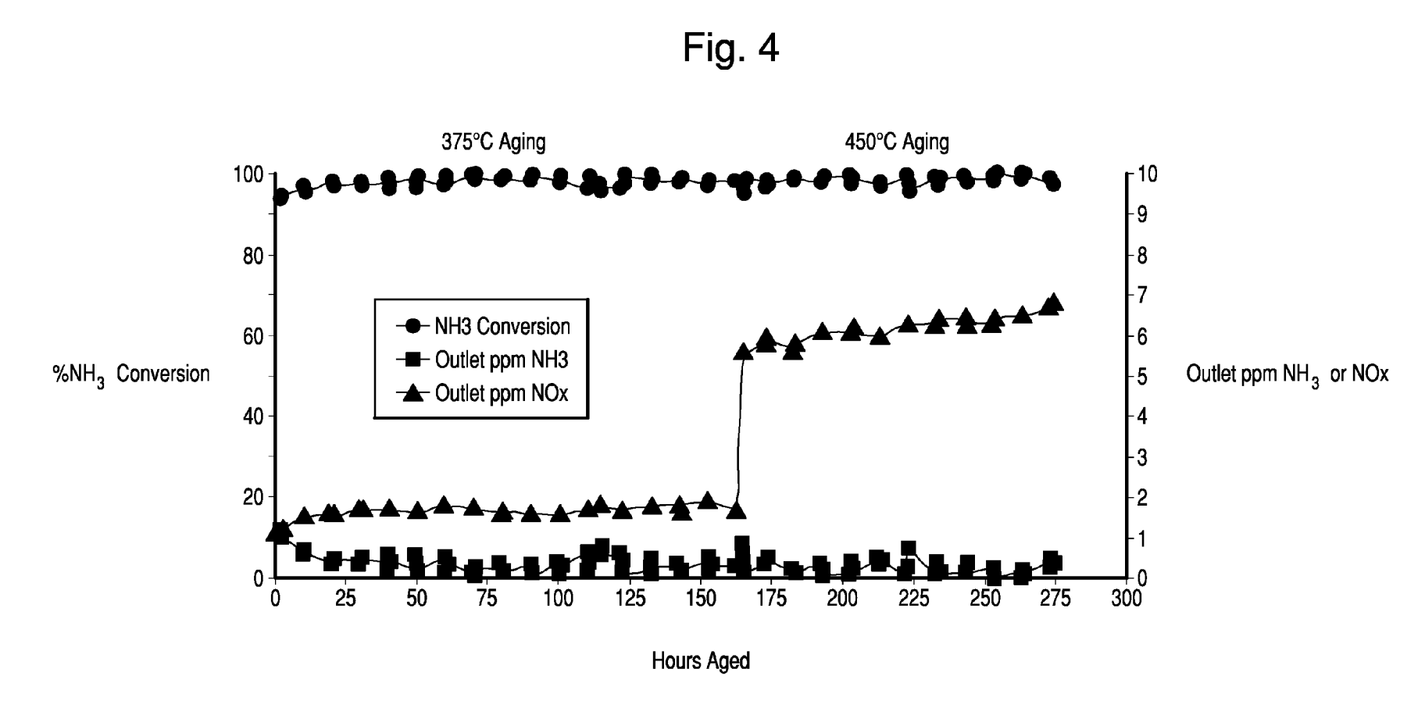
FIG. 4 depicts a graph showing ammonia conversion, outlet ammonia and outlet NOx during aging of the catalyst of the present invention.

114.4 g of DI water and 49.77 g copper (II) nitrate was added to Waring blender cup and mix until copper nitrate dissolved. 121.5 g of zeolite Y powder was added to the blender slowly with continuous mixing. The slurry was then washcoat onto a 1"×1"×6" cordierite honeycomb substrate at a target loading of 1.7 g/in$^3$ and calcined at 550° C. for 2 hrs. The coated substrate was tested for outlet ammonia and NOx and ammonia conversion during aged at 375° C. for 150 hours, and then at 450° C. for an additional 150 hours. The results are shown in FIG. 4.

Example 4

218.8 g of zeolite was added to 156.2 g of DI water and ball milled for 30 minutes. 0.6 g of platinum 'A' solution was added to 6.2 g DI water and then added to the ball milled zeolite Y solution and mixed for 20 minutes. 59.7 g of copper nitrate was added to 35.8 g DI water and mixed until the copper nitrate was dissolved. The copper nitrate was then added to the zeolite Y and platinum ball mill solution and mix for 20 minutes. 7.2 g of acetic acid and 3.6 g DI water was added and mixed for 20 minutes. 18.5 g of Ludox AS 40 and 0.5 g of 2-Octanol was added. The mixture was ball milled to achieve particle sizes of 1-7 microns. The mixture was removed from milling and adjusted to a slurry content 41% water. The slurry was coated onto 1"×1"×6" cordierite honeycomb substrate at a target loading of 1.7 g/in$^3$ and calcined at 550° C. for 2 hrs.

Figure 5:
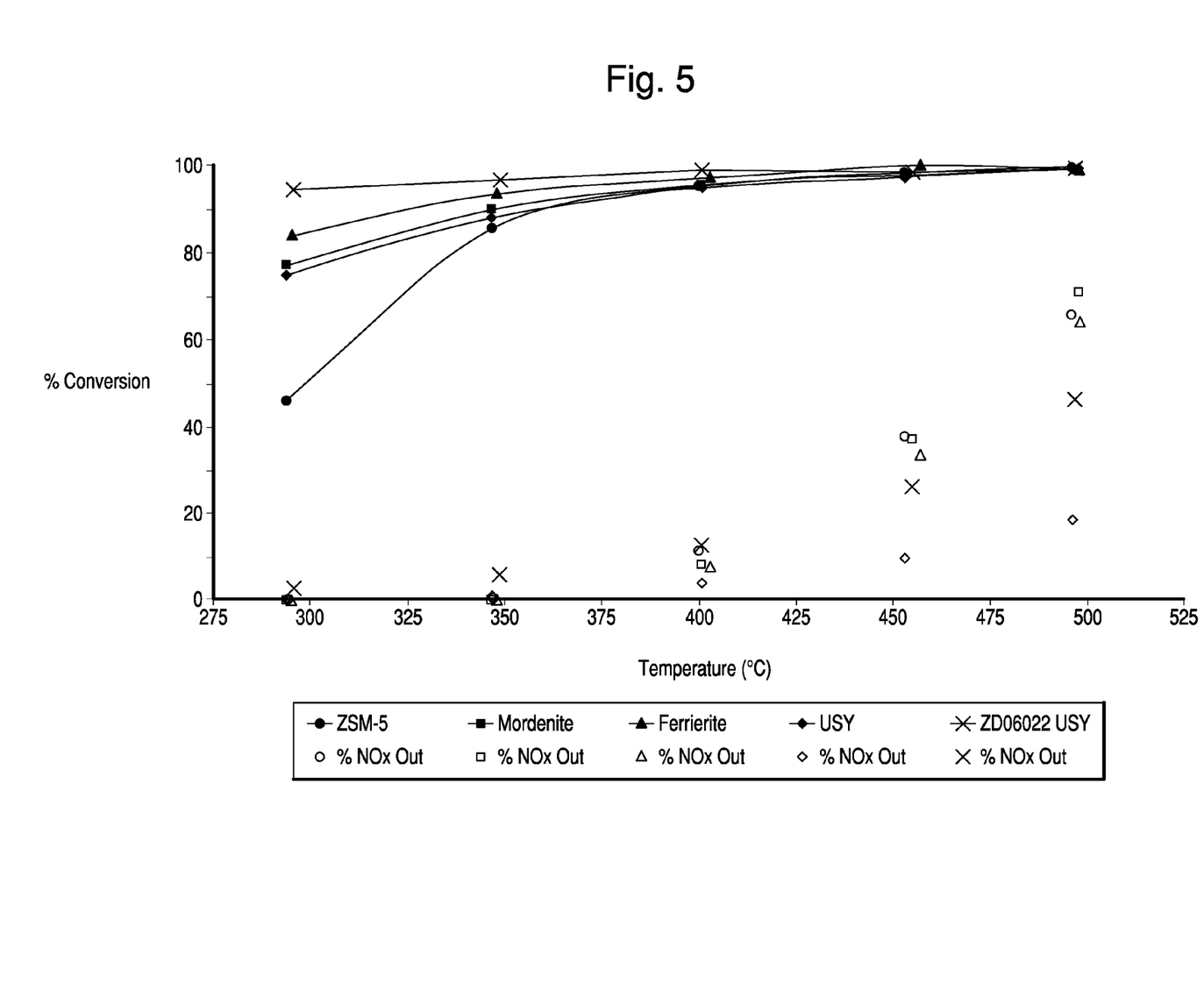
FIG. 5 depicts a graph comparing the conversion of ammonia at various temperatures with a catalyst containing platinum and copper on various zeolite supports.

This procedure was repeated to prepare cordierite honeycomb substrates containing ZSM-5, mordenite, ferrierite, USY and ZD06022 USY. The substrates were tested for ammonia conversion at various temperatures. The results are shown in FIG. 5.

Example 5

49.77 g copper (II) nitrate was added to a Waring blender cup with 114.4 g DI water and mixed until the copper nitrate dissolved. 121.5 g of CBV 500 zeolite powder was added to the blender slowly with mixing. The slurry was then coat onto a 1"×1"×6" cordierite honeycomb substrate at a target loading of 1.7 g/in$^3$ and calcined at 550° C. for 2 hrs. The final washcoat contained 13.6 wt % Cu relative to the zeolite. The washcoat was scraped off and analyzed by temperature programmed reduction (TPR) to determine the resulting Cu metal compound species.

The procedure was repeated with an appropriate amount of copper (II) nitrate and water to yield washcoated honeycombs containing 6 wt. %, 10 wt. %, 16 wt. % and 20 wt. % Cu relative to the zeolite. The washcoats were scraped off and analyzed by temperature programmed reduction (TPR) to determine the resulting Cu metal compound species.

Figure 6:
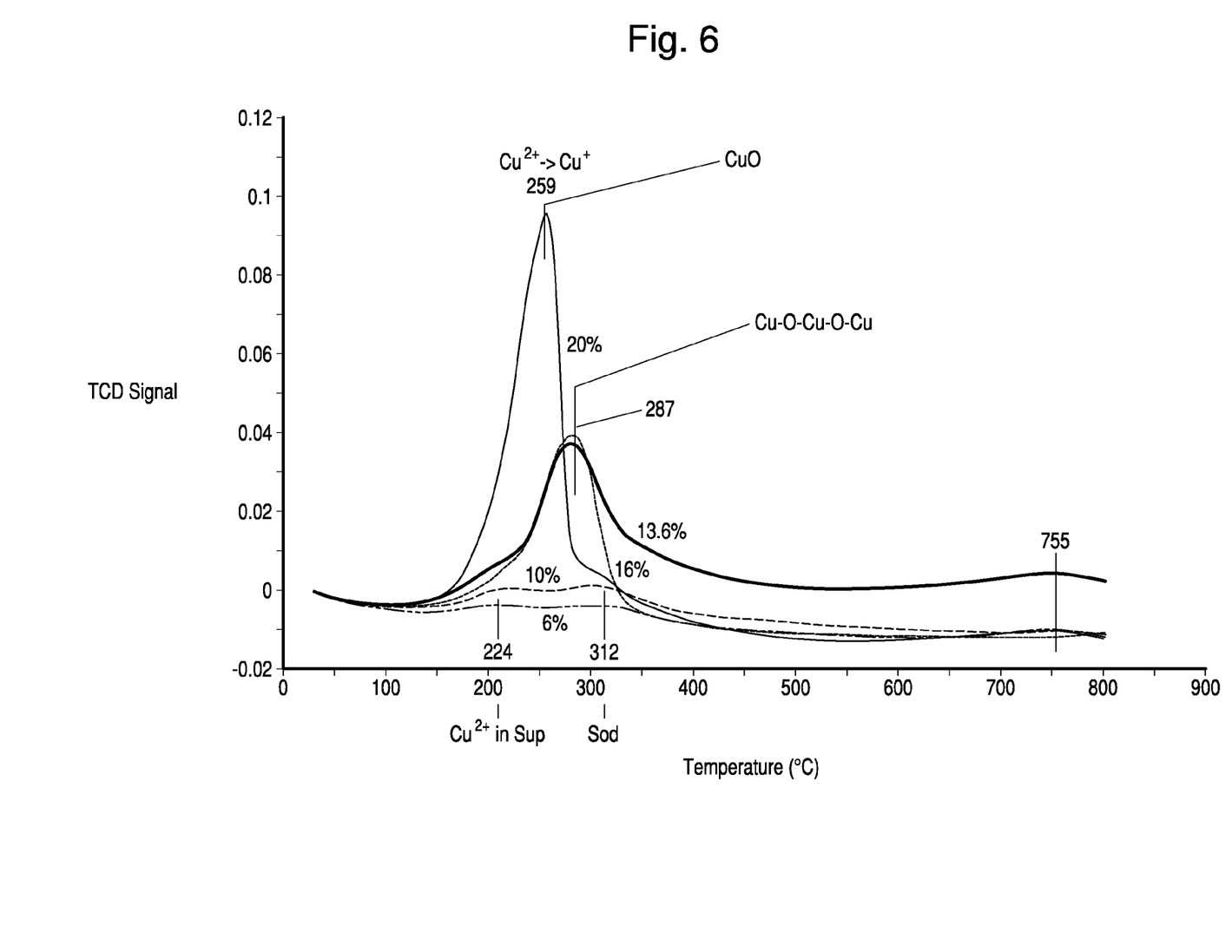
FIG. 6 depicts a graph showing the nature of the metal loaded onto a zeolite support.

At 6 wt. % and 10 wt. %, the Cu was exchanged into the zeolite as copper ions (Cu$^{2+}$), as shown by peaks 224 and 312 in FIG. 6. At 13.6 wt. % and 16 wt. %, the Cu was present as a metal-oxygen complex (comprising multiple metal and oxygen atoms (e.g., O—Cu—O—Cu—O—Cu—O)), as shown by peak 287 in FIG. 6. And at 20 wt. % the Cu was present as copper oxide (CuO), as shown by peak 259 in FIG. 6.

What is claimed is:

1. A method for treating the flue gas stream generated by a stationary combustion source equipped with a selective catalytic reduction (SCR) system and for selectively oxidizing unreacted ammonia to nitrogen, said method comprising:
   (a) contacting said flue gas stream containing said unreacted ammonia with an ammonia oxidation catalyst in the presence of an oxidant, wherein said ammonia oxidation catalyst comprises a zeolite, a precious metal and a base metal compound; and
   (b) thereby oxidizing said unreacted ammonia to nitrogen.

2. The method of claim 1, wherein said ammonia oxidation catalyst is located downstream from said selective catalytic reduction system.

3. The method of claim 1, wherein said ammonia oxidation catalyst is added to said selective catalytic reduction system.

4. The method of claim 1, wherein said precious metal is selected from the group consisting of platinum, palladium, rhodium and gold.

5. The method of claim 4, wherein said precious metal is platinum.

6. The method of claim 1, wherein said precious metal loading is from about 0.1 to about 100 g/ft$^3$.

7. The method of claim 1, wherein said precious metal content is from about 0.02 wt. % to about 0.20 wt. % of the total weight of said zeolite.

8. The method of claim 1, wherein said base metal compound is from about 2 wt. % to about 20 wt. % of the total weight of said zeolite.

9. The method of claim 1, wherein said base metal compound is selected from the group consisting of copper, vanadium, manganese, zinc, zirconium, and molybdenum metal compounds.

10. The method of claim 9, wherein said base metal compound is a base metal-oxygen complex.

11. The method of claim 1, wherein said zeolite is selected from the group consisting of mordenite, ferrierite, zeolite Y, ZSM-5, and beta zeolites.

12. The method of claim 1, wherein said ammonia oxidation catalyst further comprises one or more rare earth metals.

13. The method of claim 1, wherein said treated flue gas is contacted with the ammonia oxidation catalyst at temperatures from about 200° to about 450° C.

14. The method of claim 1, wherein said ammonia oxidation catalyst is applied onto a substrate in the form of a honeycomb.

15. The method of claim 1, wherein a source of oxygen is added to said flue gas stream prior to contact with said ammonia oxidation catalyst.

16. The method of claim 1, wherein said flue gases are obtained from the combustion of coal.

17. The method of claim 1, wherein said flue gases are obtained from the combustion of natural gas.

18. The method of claim 1, wherein said flue gases are obtained from the combustion of oil.

* * * * *